July 6, 1943. A. P. JORGENSON 2,323,403
PAINT MIXING MACHINE
Filed Aug. 23, 1940 3 Sheets-Sheet 1
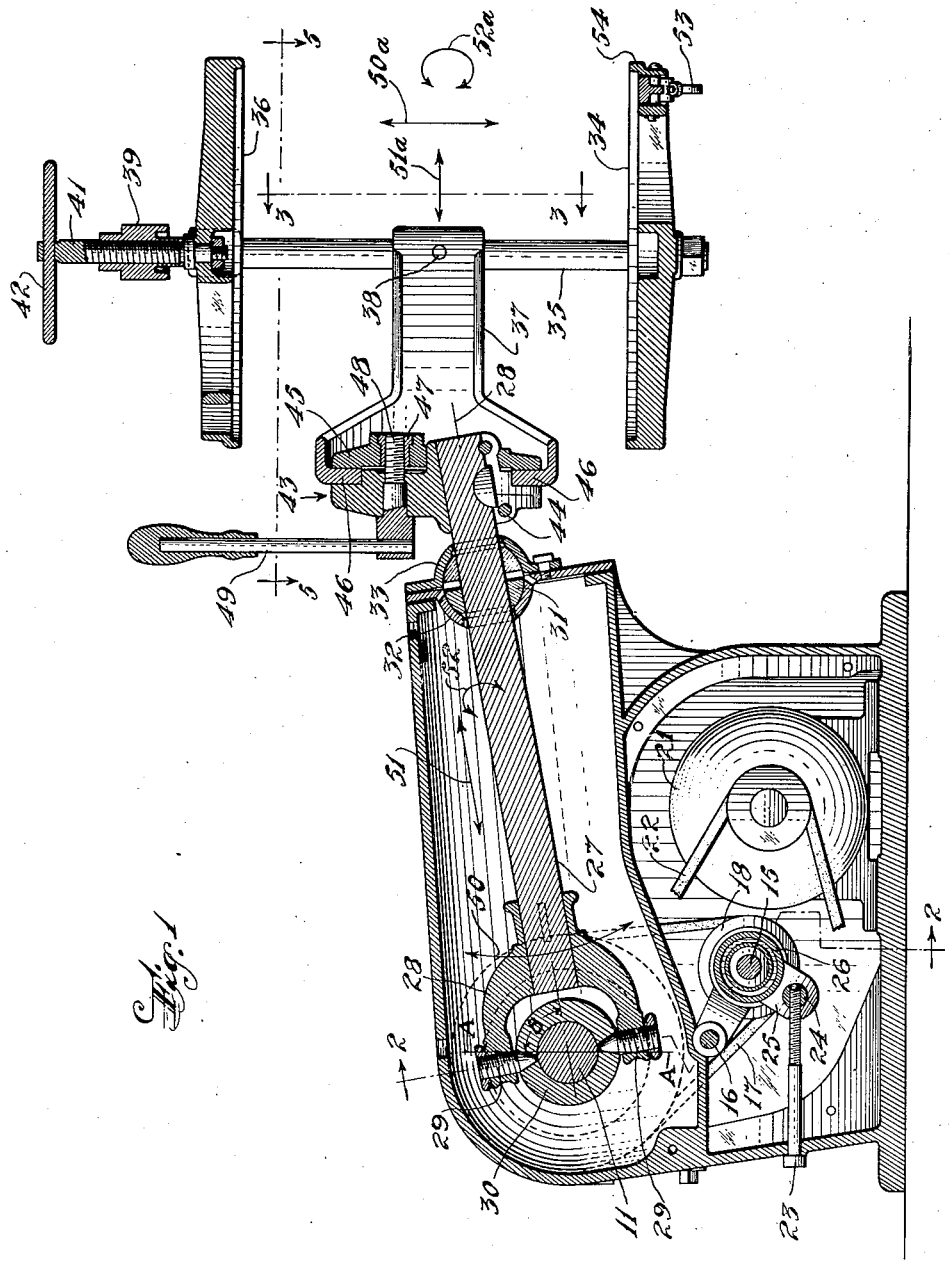
INVENTOR
Arthur P. Jorgenson
BY
ATTORNEY July 6, 1943.　　A. P. JORGENSON　　2,323,403
PAINT MIXING MACHINE
Filed Aug. 28, 1940　　3 Sheets-Sheet 2
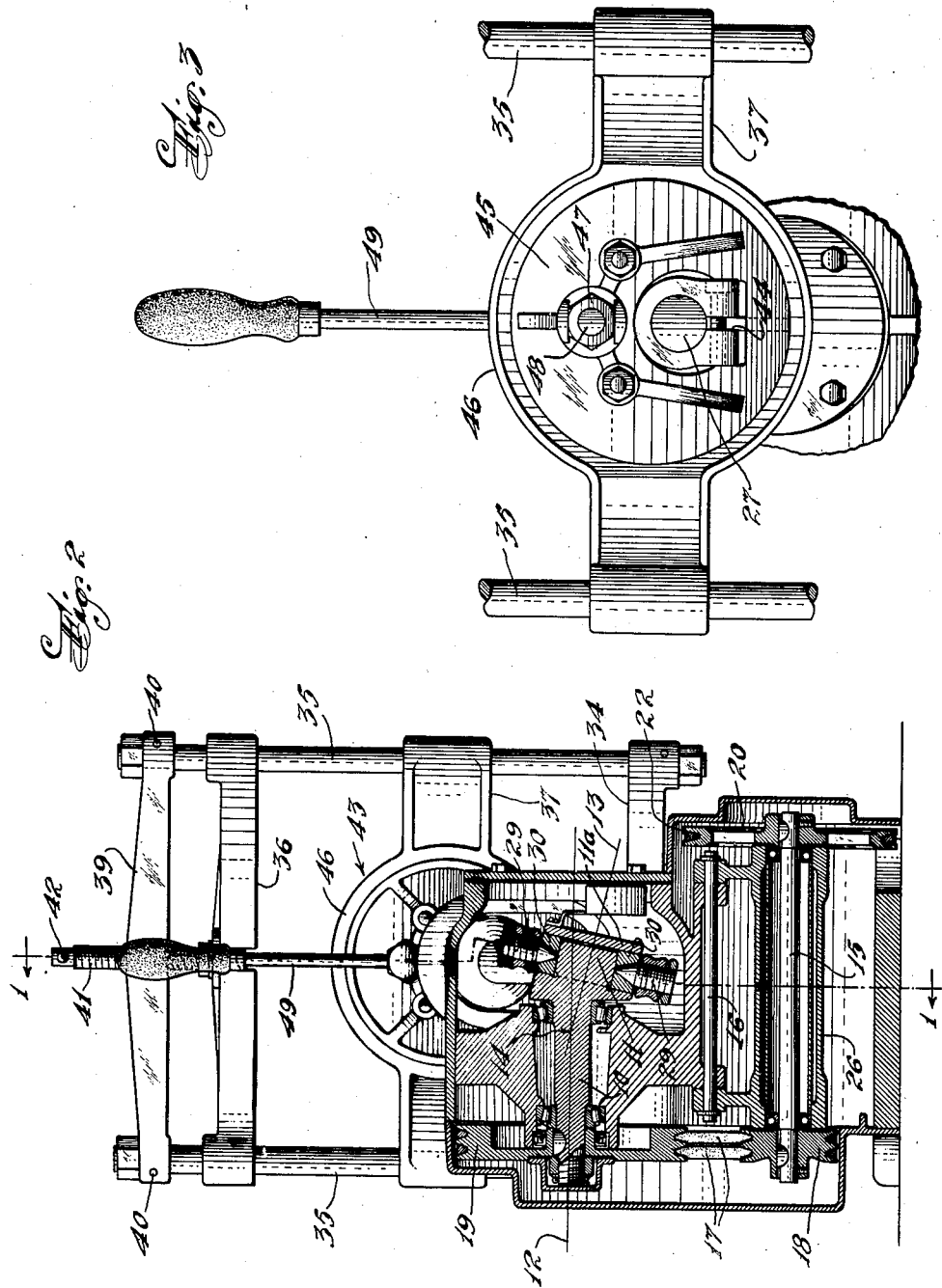
INVENTOR
Arthur P. Jorgenson
BY
ATTORNEY July 6, 1943.   A. P. JORGENSON   2,323,403
PAINT MIXING MACHINE
Filed Aug. 28, 1940   3 Sheets-Sheet 3
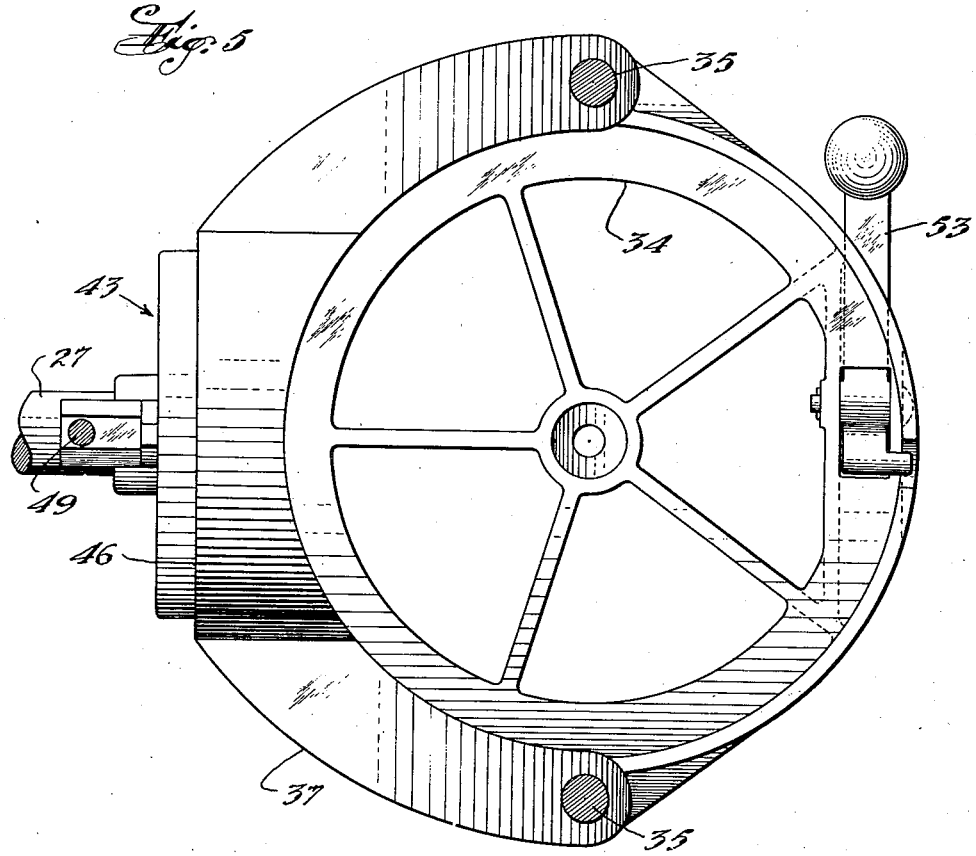
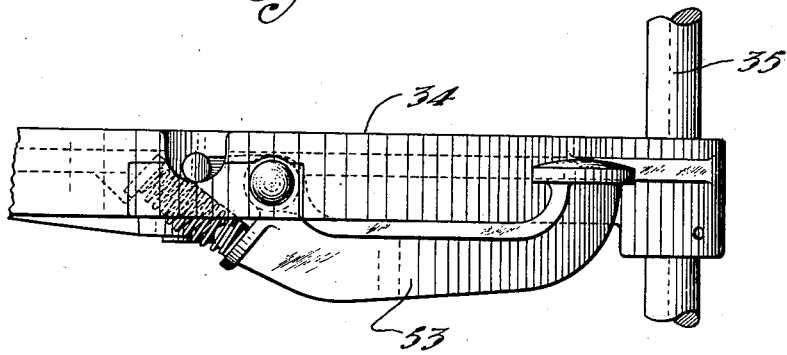
INVENTOR
Arthur P. Jorgenson
BY
ATTORNEY Patented July 6, 1943

2,323,403

UNITED STATES PATENT OFFICE 2,323,403

PAINT-MIXING MACHINE

Arthur P. Jorgenson, Racine, Wis., assignor to Landon P. Smith, Inc., Irvington, N. J., a corporation of New Jersey Application August 28, 1940, Serial No. 354,492

2 Claims. (Cl. 259—72)

My invention relates to improvements in paint-mixing machines.

One of the objects of my invention is to provide an improved paint-mixing machine of the general type as disclosed in my Patent No. 2,109,233, issued February 22, 1938, but which is capable of efficiently handling substantially greater loads, such as 5-gallon cans of paint.

Other objects and advantages will hereinafter appear.

For the purpose of illustrating my invention, an embodiment thereof is shown in the drawings, wherein Figure 1 is a side, elevational view, partly in section, of a paint-mixing machine constructed and operating in accordance with my invention, the section being taken partly on the line 1—1 in Fig. 2;

Fig. 2 is a sectional, elevational view, the section being taken partly on the line 2—2 in Fig. 1;

Fig. 3 is a section taken on the line 3—3 in Fig. 1;

Fig. 4 is an enlarged, detail, fragmentary view in elevation and looking toward the left in Fig. 1; and Fig. 5 is a section taken on the line 5—5 in Fig. 1.

In the disclosed embodiment of my invention, a drive shaft in the form of a crankshaft 10, provided at one end thereof with a crank or eccentric portion 11, is supported, as shown, for rotation about its longitudinal axis 12 which is horizontally disposed.

The axis 13 of the crank or eccentric portion 11 is disposed at an acute angle of approximately 15 degrees to the axis 12 of the crankshaft, and intersects the axis 12 at a point 14 in close proximity to the crank portion 11.

The crankshaft 10 is driven from a countershaft 15 swung from a rod or hinge pin 16, the connection being by means of belting 17 around a pulley 18 fixed on the countershaft 15 and a pulley 19 fixed on the crankshaft. A pulley 20 fixed on the countershaft is driven by an electric motor 21 through a belt 22. Tension of the drive belt 22 may be varied by adjusting the bolt 23 which has a screw-thread engagement with a pivot block 24 rotatably supported in spaced lugs 25 with which the housing 26 of the countershaft is provided. In Fig. 1, the countershaft 15 is shown in normal operating position, but for clarity of illustration, is shown in Fig. 2 as being vertically below the supporting hinge pin 16.

A driven shaft in the form of a connecting rod 27, is supported as shown in Fig. 1, with its longitudinal axis 28 perpendicular to and intersecting the axis of the crank or eccentric portion 11. The respective axes 12 and 13 of the drive shaft 10 and the crank portion 11, which intersect at the point 14, define the vertical plane AA. The driven shaft or connecting rod 27 is disposed with its longitudinal axis 28 at the acute angle B to the vertical plane AA.

Connection between the driven shaft 27 and the crank portion 11 is made through a universal joint which comprises the fork 28A fixed on the adjacent end of the shaft 27, the diametrically-opposite bearing screws 29 carried by the fork, and the universal bearing ring 30 disposed on the eccentric portion 11 and rotatable with respect thereto. The adjacent, conical ends of the bearing screws 29 seat into the bearing ring 30, as shown, and are rotatable with respect thereto. A thrust plate 11a is fixed with respect to the eccentric portion 11.

The other end of the driven shaft 27 is supported by and slideable in a front bearing 31 which has a universal, swivel action in the complementary bearing sockets 32 and 33.

The can holder comprises the jaw 34 supported by and fixed to the lower ends of the vertical rods 35, the complementary jaw 36 which is slideable on these rods, and the U-shape bracket 37 to which the rods 35 are fixed by rivets 38. A crossbar 39 is fixed by pins 40 to the upper ends of the rods 35. The movable jaw 36 has a rotatable connection with the lower end of a clampscrew 41 which is threaded through the crossbar 39 and is provided at its upper end with a handle 42. Clockwise rotation of the clampscrew 41 causes downward movement of the jaw 36 to grip the can of paint, and opposite rotation of the clampscrew releases the can.

The can holder is adjustably carried by a vise fixed on the front end of the driven shaft 27, and designated generally by the reference numeral 43. The vise 43 comprises the hub part 44 fixed on shaft 27 and the jaw part 45 which is movable with respect to the hub part. The bracket 37 of the can holder is provided with the flange 46 which is rotatable on the hub part 44, and which is gripped between the vise parts 44 and 45 to hold the can holder rigidly with respect to the shaft 27. A locknut 47, inserted into the jaw part 45 and having a square or hexagonal head to prevent relative rotation, receives the threaded end of the lockscrew 48 which is rotated by the handle 49.

In the operation of my improved paint-mixing machine, the drive shaft 10 rotates continuously at a relatively high, uniform rate. On account of the eccentric or crank portion 11 and the disposition or relation of the axes 12, 13 and 28 with respect to each other, the driven shaft 27 is given a composite or resultant movement made up of three distinct, component movements. One of these component movements, represented at 50, is a rapid oscillatory movement in a vertical plane, about the front bearing 31 as a center. This results in a rapid raising and lowering, represented at 50a, of the can holder and paint can gripped between the jaws 34 and 36.

Another of the component movements, represented at 51, is a rapid straight-line, reciprocatory movement of the shaft 27 in the direction of its longitudinal axis 28. As represented at 51a, this results in a rapid, back-and-forth or straight-line reciprocatory movement of the can and holder therefor.

Another of the component movements, represented at 52, is a rapid rocking movement of the shaft 27 about its axis 28. As represented at 52a, this results in a corresponding, rapid, rocking movement of the can and holder about a horizontal axis.

The resultant movement of the can and holder, made up of the three distinct, component movements 50a, 51a and 52a, causes terrific, constant agitation at high speed at every possible tangent and angle, literally tears pigments apart, disintegrates any sediment on walls of the can and thoroughly mixes them with the vehicle.

By swinging over the handle 49 to turn the lockscrew 49 and release flange 46, the holder can be rotated bodily about the horizontal axis to set the paint can in a position right side up, or in a position upside down, or in the intermediate, side-way position. The handle 49 is then swung back to tighten up on the lockscrew 48 whereby the can and holder are held rigidly in the desired position. After a few minutes of conditioning in each of the three positions, the paint becomes factory fresh, full of life, and is in perfect consistency throughout. The can is then released by turning the handle 42 to raise jaw 36. For the purpose of facilitating removal of the can, a foot lever 53, pivotally mounted on the lower jaw 34, may be depressed to engage and tilt the can slightly so that at this place it is above the flange 54.

While but one embodiment of my invention has been disclosed, it will be understood that various modifications thereof are possible without departing from the spirit of my invention or the scope of the claims.

I claim as my invention:

1. In a paint-mixing machine, agitating means comprising a drive shaft having an eccentric crank portion whose axis is disposed at an acute angle to the axis of said shaft, a driven shaft, universal means connecting said driven shaft to said eccentric crank portion, a swivel bearing supporting the other end of said driven shaft, said driven shaft being slideable and rotatable in said bearing.

2. In a paint-mixing machine, means for holding a can of paint, means supporting said can-holding means for simultaneous reciprocatory movements about axes substantially perpendicular to each other and for a simultaneous rocking movement substantially about one of said axes, and means for driving said can-holding means.

ARTHUR P. JORGENSON.